(12) United States Patent
Wehler

(10) Patent No.: US 8,151,956 B2
(45) Date of Patent: Apr. 10, 2012

(54) SUPPORTING CARRIAGE FOR A POWER CONDUCTING DEVICE, AND POWER CONDUCTING DEVICE

(75) Inventor: Herbert Wehler, Neunkirchen (DE)

(73) Assignee: Tsubaki Kabelschlepp GmbH (DE)

( * ) Notice: Subject to any disclaimer, the term of this patent is extended or adjusted under 35 U.S.C. 154(b) by 537 days.

(21) Appl. No.: 11/663,379

(22) PCT Filed: Oct. 14, 2005

(86) PCT No.: PCT/EP2005/011078
§ 371 (c)(1),
(2), (4) Date: May 16, 2008

(87) PCT Pub. No.: WO2006/042707
PCT Pub. Date: Apr. 27, 2006

(65) Prior Publication Data
US 2008/0230340 A1    Sep. 25, 2008

(30) Foreign Application Priority Data
Oct. 15, 2004  (DE) .......................... 10 2004 050 148

(51) Int. Cl.
*H02G 11/00*    (2006.01)
(52) U.S. Cl. ..................................... 191/12 C; 191/12 R
(58) Field of Classification Search ................ 191/12 R, 191/12 C; 59/78.1
See application file for complete search history.

(56) References Cited

U.S. PATENT DOCUMENTS

| | | | |
|---|---|---|---|
| 2,864,907 A * | 12/1958 | Waninger | ..................... 191/12 C |
| 3,944,059 A * | 3/1976 | Garvey | .......................... 198/850 |
| 3,948,041 A | 4/1976 | Börjesson | |
| 4,325,521 A | 4/1982 | Homersham | |
| 4,462,565 A | 7/1984 | Johnson | |
| 4,600,817 A | 7/1986 | Hackenberg | |
| 4,798,479 A * | 1/1989 | Morita | ............................. 384/45 |
| 5,584,377 A * | 12/1996 | Lago | ............................. 198/841 |

(Continued)

FOREIGN PATENT DOCUMENTS

DE      874 209     4/1953

(Continued)

OTHER PUBLICATIONS

English language Abstract, Translated Description and Claims of DE 199 06 768 A1, European Patent Office's esp@cenet.com database, 5pp., Dec. 1999.

(Continued)

*Primary Examiner* — Mark Le
(74) *Attorney, Agent, or Firm* — Smith Law Office

(57) ABSTRACT

A power transmission device is proposed especially for long pathways, which comprises at least one energy supply unit composed of members, which are linked together around axes perpendicular to the longitudinal direction of the energy supply unit, wherein a first end of the energy supply unit can be fixed locally and the second end can be moved at least in the longitudinal direction. The energy supply unit forms an upper run and a lower run, whereby between these at least one cart is arranged, which can be moved back and forth in the longitudinal direction of the energy supply unit. This cart has a base body, which is connected to a return motion device. The return motion device is formed at least partially by at least on curved guide channel, so that the energy supply unit is guided in the curved region.

6 Claims, 3 Drawing Sheets

U.S. PATENT DOCUMENTS

| | | |
|---|---|---|
| 5,692,984 A | 12/1997 | Kayatani et al. |
| 7,310,935 B2 | 12/2007 | Worms |

FOREIGN PATENT DOCUMENTS

| | | |
|---|---|---|
| DE | 1 098 563 | 2/1961 |
| DE | 2 417 516 | 11/1974 |
| DE | 32 41 924 C2 | 9/1986 |
| DE | 199 06 768 A1 | 12/1999 |
| EP | 0 725 228 A1 | 8/1996 |
| EP | 1 193 420 A1 | 4/2002 |
| JP | 38-21568 | 10/1960 |
| JP | 54-29491 | 3/1979 |
| JP | 10-220533 | 8/1998 |
| JP | 2001-221293 | 8/2001 |
| WO | WO 03/060346 A1 | 7/2003 |

OTHER PUBLICATIONS

English language Translated Description and Claims of DE 1 098 563, European Patent Office's esp@cenet.com database, 2pp.

English language Abstract, Translated Description and Claims of JP 10-220533, Japanese Patent Office, 7pp., Aug. 1998.

English language Abstract of JP 54-29491, European Patent Office, 1p., Mar. 1979.

English language Abstract of JP 2001-221293, European Patent Office's esp@cenet.com database, 1p., Aug. 2001

* cited by examiner

SUPPORTING CARRIAGE FOR A POWER CONDUCTING DEVICE, AND POWER CONDUCTING DEVICE

FIELD AND BACKGROUND OF THE INVENTION

The invention relates to a cart for an energy supply unit, which can be arranged between an upper run and a lower run of the energy supply unit, as well as to an energy supply device comprising at least one energy supply chain and a cart arranged between an upper run and lower run of the energy supply chain.

Energy supply chains are used in different apparatus, machines and devices, especially where it is necessary to transport utilities, for example, power, water, air as well as power in the form of current with the aid of lines, tubes or similar from a fixed connection to a movable connection of a user. An energy supply chain can have one strand or several strands in which lines, tubings or other similar flexible lines are guided.

When the energy supply pathway is very long, the problem arises that due to the weight of the energy supply chain itself as well as the weight of the lines and tubes, the energy supply chain or the chain links are highly stressed. This is especially the case when an upper run of an energy supply chain lies on a lower run, so that, due to the movement between the upper run and lower run, high frictional forces arise which lead, on the one hand, to wear of the, and on the other hand to a resistance to movement, as a result of which the force or power necessary to move the energy supply chain is increased and there is a danger that breakage of the chain or of its connection points will occur. Especially in the case of very long pathways of an energy supply chain, the linking bonds of the links of the energy supply chain are subjected to high tensile and compressive forces.

In order to minimize the frictional forces between an upper run and a lower run can be achieved with the aid of a so-called guide shoe. Guide shoes are arranged at least on some of the links of the energy supply chain, to reduce the frictional resistance between the areas of the runs that rub against one another.

It is known from EP 0 725 228 A1 that a cart can be arranged between an upper run and lower run of the energy supply chain. The cart has wheels or similar which are suitable to roll at the same time on the top of the lower run and on the bottom of the upper run. For synchronous movement of the cart with the moving end of the energy supply chain, the cart has a pulley on each of its opposite ends. The movable connection, is connected to a pair of cables and then to the movable end of the energy supply chain. One cable is guided over one of the pulleys at one end and the other cable over the other pulley on the opposite end of the cart. The ends of the cables are joined to the local connection of the energy supply chain. With the movement of the moving connection, the cart is moved by one or the other cable.

The problem with such an arrangement is that, due to the stretching of the cable, synchronous movement cannot be achieved reliably. Moreover, there is a danger that the cable can jump out of the pulley, which can destroy the cable guide.

From WO 03/060346, an energy supply device is known which has at least one power guide chain composed of separate links. The power guide chain links are linked to one another by axes perpendicular to the longitudinal direction of the energy supply chain. A first end of the energy supply chain is fixed while the second end of the energy supply chain can be moved in this longitudinal direction.

A cart is arranged between the upper run and lower run of the energy supply chain.

This cart is connected functionally to the upper run in such a way that during the functional connection the cart is moved only by the upper run. As a result, increased operational safety is achieved since passive drive of the cart occurs. The expenditure for the structure as well as for the mounting of such an energy supply device is reduced. The cart has a return motion device to ensure that the cart is put into motion even when there is no friction or insufficient friction between the upper run and the cart to entrain the cart by the upper run.

SUMMARY OF THE INVENTION

Given the shortcomings of the prior art the present invention is directed to a cart that is always entrained.

The present invention is directed to a cart for an energy supply unit that is disposed between an upper run and a lower run of the energy supply unit so that the two can be moved together. The cart has a base body which is connected to a return motion device. The return motion device is designed so that it is formed at least partly by a curved guide channel. Based on this design of the cart in accordance with the invention, the cart is entrained in the radius of curved region of the energy supply unit. It is so assured at any time that an effective entrainment of the cart is achieved. Another advantage of the design of the cart in accordance with the invention is that, through at least one guide channel, centering of the energy supply unit on the cart is achieved. This is especially advantageous when very long pathways are to be realized. The energy supply unit can be constructed from individual links. A polygonal effect arises within the curved region of the energy supply unit, which will not have an adverse influence on the entrainment of the cart. Moreover, the guide channel can define the radius of curvature or a curved region so that an improved run of the movement of the energy supply unit is achieved. This is important especially in the case of energy supply units which are loaded with large weights.

The curve-shaped guide channel preferably has an inner and an outer curved section. The curved sections are preferably arranged concentrically to one another and be produced from sheet material and/or plastic. According to a preferred embodiment of the cart, it is proposed that the at least one guide channel be formed by an inner and at least two outer curved sections spaced apart from one another. The advantage of such a design of the guide channel allows the energy supply unit to lie on the inner curved section while the two spaced apart outer curved sections permit to guide the energy supply unit.

According to yet another advantageous embodiment of the cart, it is proposed that the inner curved section has an angle of circumference which is larger than an angle of circumference of the outer curved section. In this case, a design is preferred in which the angle of circumference of the inner curved section is greater than 180 degrees.

In order to reduce the frictional forces within the guide channel according to yet another advantageous design of the cart it is proposed that the at least one guide channel is formed at least partially sliding. The sliding design of the guide channel can be achieved by making the curved sections or the inner curved section from a material having a low frictional coefficient. It is also possible to design the sliding layer as an insert which is in particular removeably joined to the inner curved section, so that this insert forms a wearing part, which can be replaced relatively easily when this is necessary due to wear.

The curved sections can be made from different materials. A design is preferred in which at least one curved section is made at least partly of metal. A design is preferred in which the curved section is bent from a sheet metal.

The invention is also directed to an energy supply device, which is especially suited for long pathways.

The energy supply device in accordance with the invention comprises at least one energy supply unit composed of links, wherein a first end of the energy supply unit can be secured in a fixed location and the second end can be moved in at least the longitudinal direction. The energy supply unit forms an upper run and a lower run with the formation of a curved region. A cart can be moved back and forth and is arranged between the upper run and lower run, wherein the cart may have a base body which is equipped with a return motion device. The return motion device may have at least one curved guide channel so that the energy supply unit is guided in the curved region. This configuration of the energy supply device in accordance with the invention is especially appropriated for long pathways. Due to the presence of the cart, the forces acting on the energy supply unit are reduced so that the load on the energy supply unit is smaller than in the case of the conventional energy supply units. By guiding the energy supply unit in the curved region, centering of the energy supply unit on the cart is also achieved. Essentially no slip occurs between the energy supply unit and the cart, especially at high accelerations of the energy supply unit and at high travel velocities.

According to still another advantageous embodiment of the energy supply device, it is proposed that at least some links of the energy supply chain have means that engage at least one guide channel. The means can be projections which are directed into the chain or similar devices. In addition or instead of the projections, the energy supply unit may have rolls which are in contact with the guide channel.

The invention has still further numerous advantages. In particular, the load of the energy supply unit as well as the load of the cables, conduits or the like guided in the energy supply unit, is reduced. Furthermore, a beaming of the energy supply chain is avoided during movement of the energy supply unit.

Further details of the invention will be explained with the aid of the practical examples shown in the drawings without the object of the invention being limited to these specific practical examples.

DETAILED DESCRIPTION OF THE PREFERRED EMBODIMENTS

Figure 1:
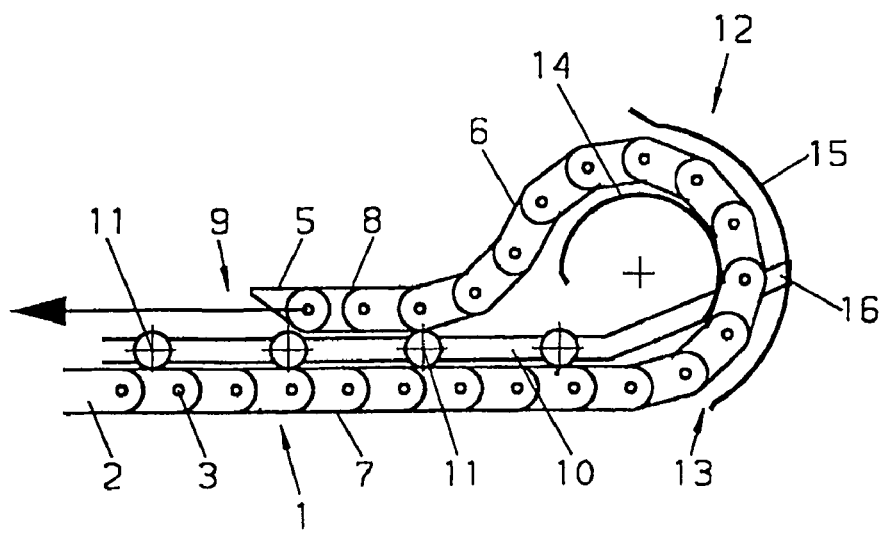
FIG. 1 is a first practical example of an energy supply unit in a first end position.
Figure 2:
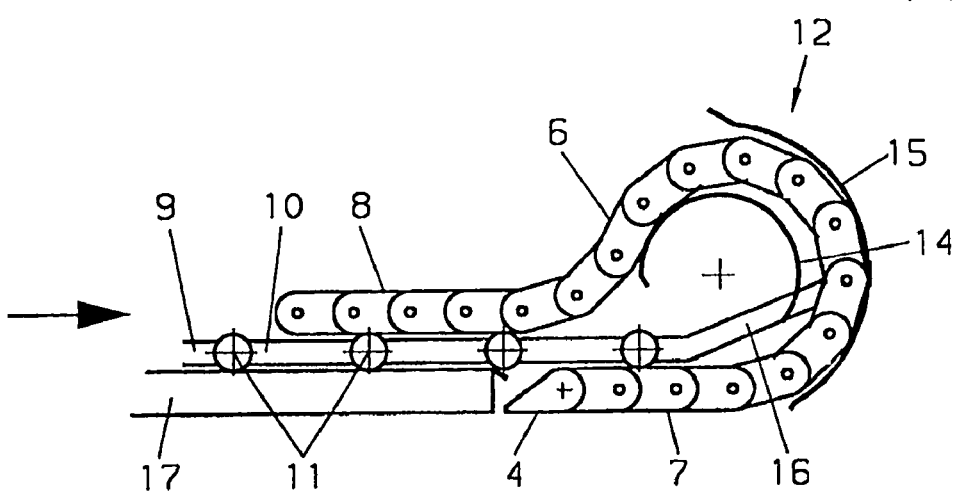
FIG. 2 shows the energy supply unit according to FIG. 1 in a second end position.

FIGS. 1 and 2 show a first embodiment of an energy supply device. The energy supply device has an energy supply unit 1 formed from links 2 which are linked to one another. The links 2 can be pivoted essentially perpendicularly to the axes 3 running in the longitudinal direction of the energy supply unit 1. At first end 4, the energy supply unit 1 is joined to a fixed location. The second end 5 can be moved in the longitudinal direction of the energy supply unit 1. A curved region 6 of the energy supply unit 1 defines a lower run 7 and an upper run 8.

A cart 9 is arranged between the upper run 8 and the lower run 7. The cart 9 has a base body 10 which is connected with rolls 11 so that the rolls 11 roll on the top side of the lower run 7 and on the bottom side of the upper run 8. A return motion device 12 is connected to the base body 10. The return motion device 12 has a curved guide channel 13. The guide channel 13 is designed so that the energy supply unit 1 is guided in the curved region 6.

The guide channel 13 is delineated by a first inner curved section 14 and by a second outer curved section 15 in the radial direction. It can be seen from the representation in FIGS. 1 and 2 that the angle of circumference of the inner curved section 14 is larger than an angle of circumference of the outer curved section 15. The angle of circumference of the inner curved section 14 is greater than 180°. The curved sections 14, 15 are connected to the cart 9 by at least one brace 16.

The joining of the curved sections 14, 15 can be done with a separable joint. The braces 16 delineate the guide channel 13 on the side.

FIG. 1 shows the energy supply device in a first end position of the energy supply unit 1. In this position, the first movable end 5 of the energy supply unit 1 assumed its first end position. When the movable end 5 is moved in the direction of the arrow, as shown in FIG. 1, then the energy supply unit 1 slides through the guide channel 13 and will rest on cart 9. The cart 9 is moved through the energy supply unit 1.

FIG. 2 shows an arrangement in which the energy supply device assumed its other end position. By applying a shearing load in the direction of the arrow in FIG. 2, the energy supply unit 1 is placed on a support. It can be seen from FIG. 2 that the cart 9 is guided on a guide 17. The height of guide 17 is dimensioned so that the cart 9 always runs in one plane.

Figure 3:
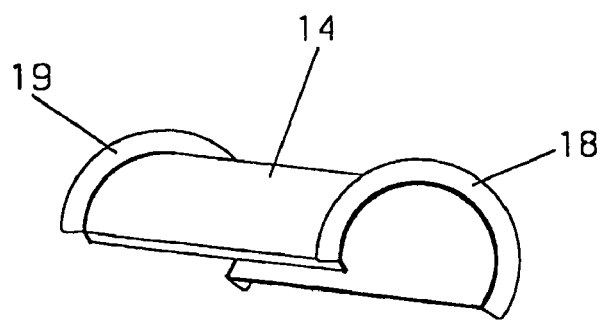
FIG. 3 is a schematic and perspective view of an outer curved section of a guide channel.

FIG. 3 shows an embodiment of an outer curved section 15. The outer curved section 15 has edge regions 18, 19 which serve to delineate the movement of the energy supply unit on the side.

Figure 4:
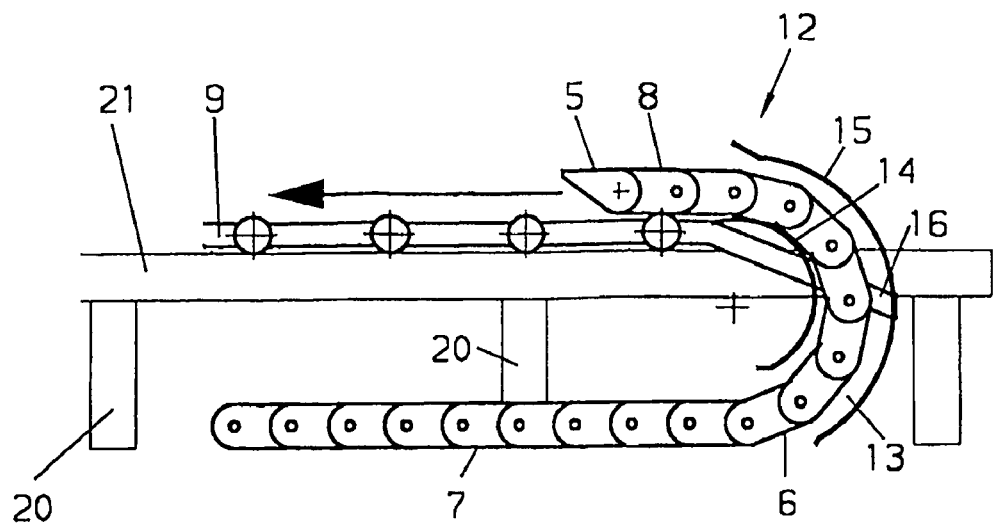
FIG. 4 is a second practical example of an energy supply device in a first end position.
Figure 5:
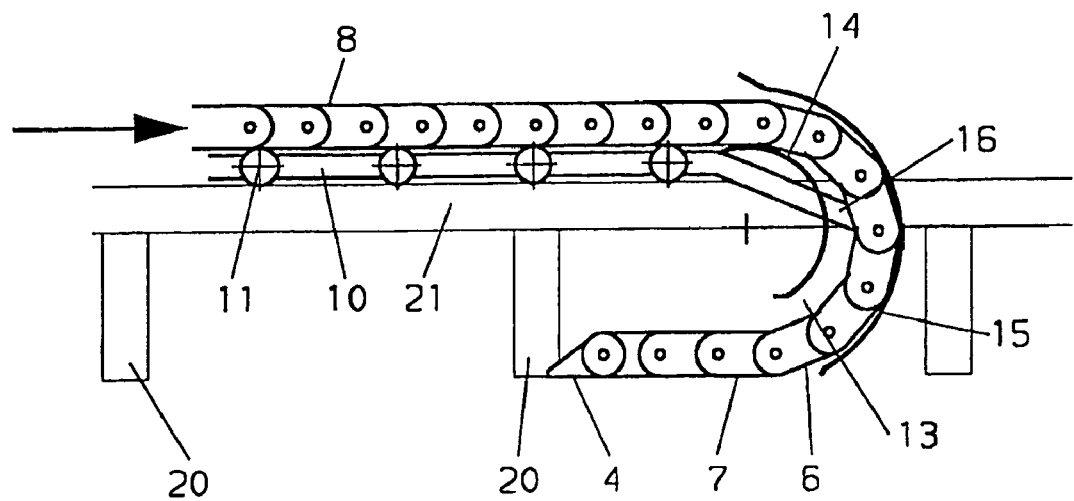
FIG. 5 is the energy supply device according to FIG. 4 in a second end position.

FIGS. 4 and 5 show a second embodiment of an energy supply device. The fundamental structure of the cart 9 with the return motion device 12 as well as the energy supply unit 1 corresponds to the embodiment shown in FIGS. 1 and 2 as described above. The energy supply device has a frame on which the cart 9 can be moved back and forth. For this purpose, a carrier 21 which runs essentially horizontally is provided and it is arranged on stilts 20.

Figure 6:
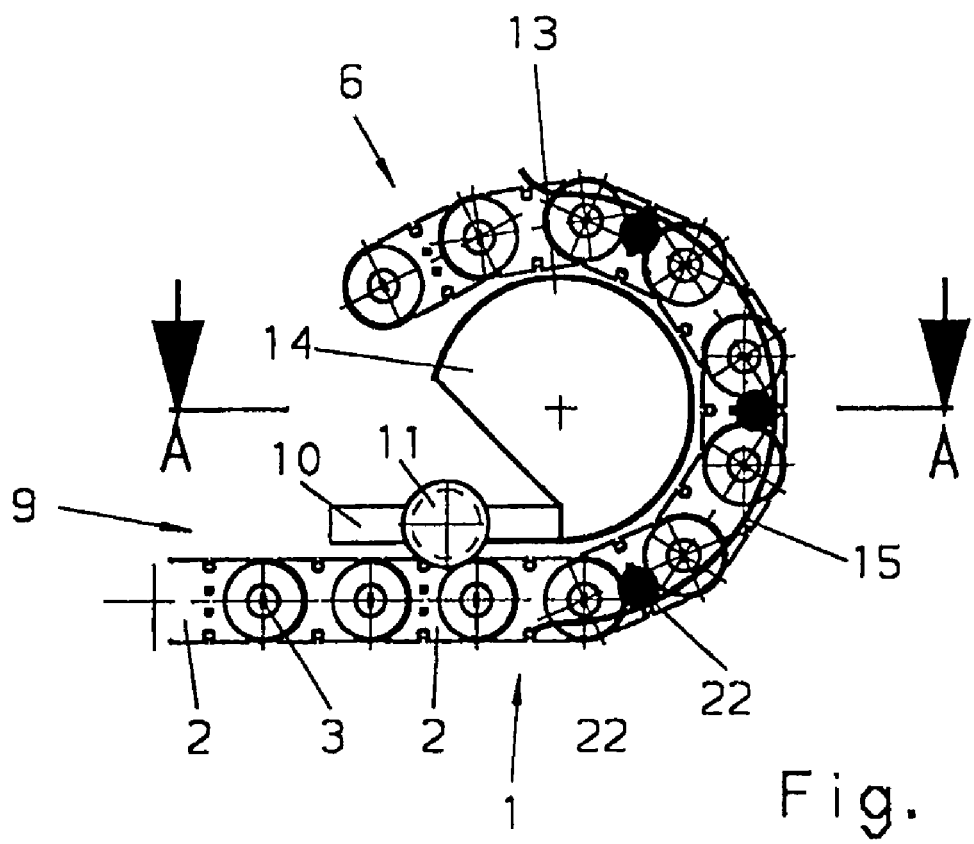
FIG. 6 is a third practical example of an energy supply device in a side view and FIG. 7 shows a cross-sectional view of the energy supply device along line A-A, whereby the energy supply unit is not shown.
Figure 7:
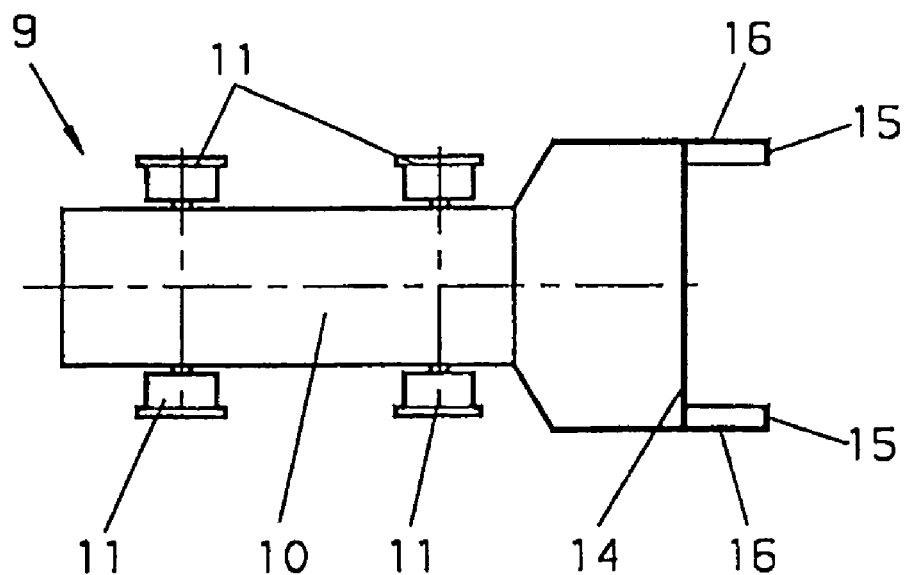

FIGS. 6 and 7 show yet another embodiment of an energy supply device with the present invention. The energy supply device has an energy supply unit composed of links 2. The links 2 are linked together. They can be pivoted around axes 3 which run essentially perpendicularly to the longitudinal direction of the energy supply unit 1. In the practical example shown, rolls 22 are provided on some links 2. The rolls 22 are arranged on the outside of the brackets of links 2. They are arranged so that they roll on the outer curved section 15. This is not absolutely necessary. It is also possible to have the rolls 22 roll on the inner curved section 14 of the return motion device 12. With this design of the energy supply device, the friction between the return motion device and the energy supply unit 1 is reduced.

It can be seen in the plan view on the cart 9 in FIG. 7 that the cart 9 has an inner curved section 14. There are two outer curved sections 15 provided which are at a distance from one another so that the energy supply unit 1 is guided between the outer curved sections 15. The outer curved sections 15 are connected to the cart 9 with braces 16.

The inner curved section 14 and the outer curved section 15 can be connected releasable to the base body 10 of the cart so that they can be separated and so that the base body 10 can be provided with differently-designed curved sections, so that the cart can be used for different energy supply units.

With the design of the cart in accordance with the invention as well as of the energy supply device, a reliable and safe guidance of the energy supply unit is achieved. Moreover, the forces acting on the energy supply unit are reduced effectively.

The invention claimed is:

1. An energy supply device, comprising:
   an energy supply unit comprising:
      a plurality of links;
      a plurality of axes disposed perpendicular to a longitudinal direction of the energy supply unit and each axis is joined to two adjacent links;
      a first end that is locally fixable;
      a second end that is movable in the longitudinal direction;
      an upper run;
      a lower run; and
   a cart disposed between the upper run and the lower run of the energy supply unit, and the cart is movable back and forth in the longitudinal direction of the energy supply unit, wherein the cart comprises:
      a base body; and
      a return motion device connected to the base body, wherein the return motion device is formed at least partially by a curved guide channel having an inner curved section, and an outer curved section spaced apart from the inner curved section, so that the energy supply unit slides along the curved guide channel, and wherein an angle of circumference of the inner curved section is greater than an angle of circumference of the outer curved section and greater than 180°.

2. The energy supply device according to claim 1, wherein the guide channel comprises at least a portion of a sliding layer.

3. The energy supply device according to claim 1, wherein the guide channel has at least one sliding layer.

4. The energy supply device according to claim 3, wherein the sliding layer is an insert disposed in the guide channel.

5. The energy supply device according to claim 1, wherein the inner curved section is at least partially made of metal.

6. The energy supply device according to claim 5, wherein the inner curved section is made of a sheet metal.

\* \* \* \* \*